INVENTOR.
HENRY E. BERNSTEIN
BY
M. O. Hayes
Attorney

RADIO RANGING AND CRAFT IDENTIFICATION SYSTEM

Filed May 22, 1946 5 Sheets-Sheet 2

INVENTOR.
HENRY E. BERNSTEIN
BY M. C. Hayes
Attorney

RADIO RANGING AND CRAFT IDENTIFICATION SYSTEM

Filed May 22, 1946 5 Sheets-Sheet 3

INVENTOR.
HENRY E. BERNSTEIN
BY M. A. Hayes
Attorney

Feb. 20, 1951 H. E. BERNSTEIN 2,541,982

RADIO RANGING AND CRAFT IDENTIFICATION SYSTEM

Filed May 22, 1946 5 Sheets-Sheet 4

*INVENTOR.*
HENRY E. BERNSTEIN
*BY*
M. O. Hayes
Attorney

RADIO RANGING AND CRAFT IDENTIFICATION SYSTEM

Filed May 22, 1946 5 Sheets-Sheet 5

INVENTOR.
HENRY E. BERNSTEIN
BY M. O. Hayes
Attorney

Patented Feb. 20, 1951 2,541,982

UNITED STATES PATENT OFFICE 2,541,982

RADIO RANGING AND CRAFT IDENTIFICATION SYSTEM

Henry E. Bernstein, United States Navy

Application May 22, 1946, Serial No. 671,488

10 Claims. (Cl. 343—6)

(Granted under the act of March 3, 1883, as amended April 30, 1928; 370 O. G. 757)

This invention relates to wireless signalling systems and apparatus. More specifically it relates to a system and apparatus for identifying mobile craft first detected and located by radio detection and ranging equipment.

The advent of radio detecting and ranging equipment makes it possible for an observer-operator to ascertain the relative position of any vehicle or object capable of reflecting radiant energy within the operative range of the equipment. However, the failure to identify located objects or vehicles is a serious deficiency in the capability of detecting and ranging equipment.

It is my intention to provide apparatus which, when installed on objects such as for instance, a mobile craft, will automatically identify the object or mobile craft to the radio detecting and ranging equipment which has detected its presence. Not only is such automatic identification an absolute necessity during a period of hostilities in order to identify friend from foe but it has commercial navigational uses as well.

For instance, if the mobile craft which has been detected by detection and ranging equipment is able to automatically identify itself by my invention, the equipment operator, knowing its location, relative to other vehicles and other objects, can by normal communication methods, direct its movement for instance into or out of a harbor. The commercial importance of this invention is apparent if it is realized ships need not lay-to outside a harbor for days or weeks on account of fog.

Under the guidance of a system of radar and identification equipment in accordance with my invention, surface or aircraft traffic can proceed without the risk of collision with each other or with stationary objects. Another objective of my invention is to provide in combination in a system in which radar equipment is carried by vehicles, apparatus to be located on stationary objects such as for instance, lighthouses, for the automatic identification thereof for navigational purposes.

Still another object of my invention is to provide radio signalling equipment in a system in combination with radio detecting and ranging equipment whereby the detecting and ranging equipment acquires information as to identity as well as presence and position of any vehicle or object within operative range and carrying signal equipment designed in accordance with my invention.

The invention further resides in the novel construction, combination and arrangement of parts in the signalling system hereinafter described and specifically pointed out in the claims.

These and additional objects will become more apparent from a consideration of the description and drawings. It is to be understood however, that I do not intend to limit the invention to the specific disclosure, but rather, to cover all modifications and alternative arrangements falling within the spirit and scope of the invention as defined in the appended claims.

For the purpose of brevity, the expression radio detecting and ranging is abbreviated "radar" in accordance with popular usage.

Figures 1, 6, 7:
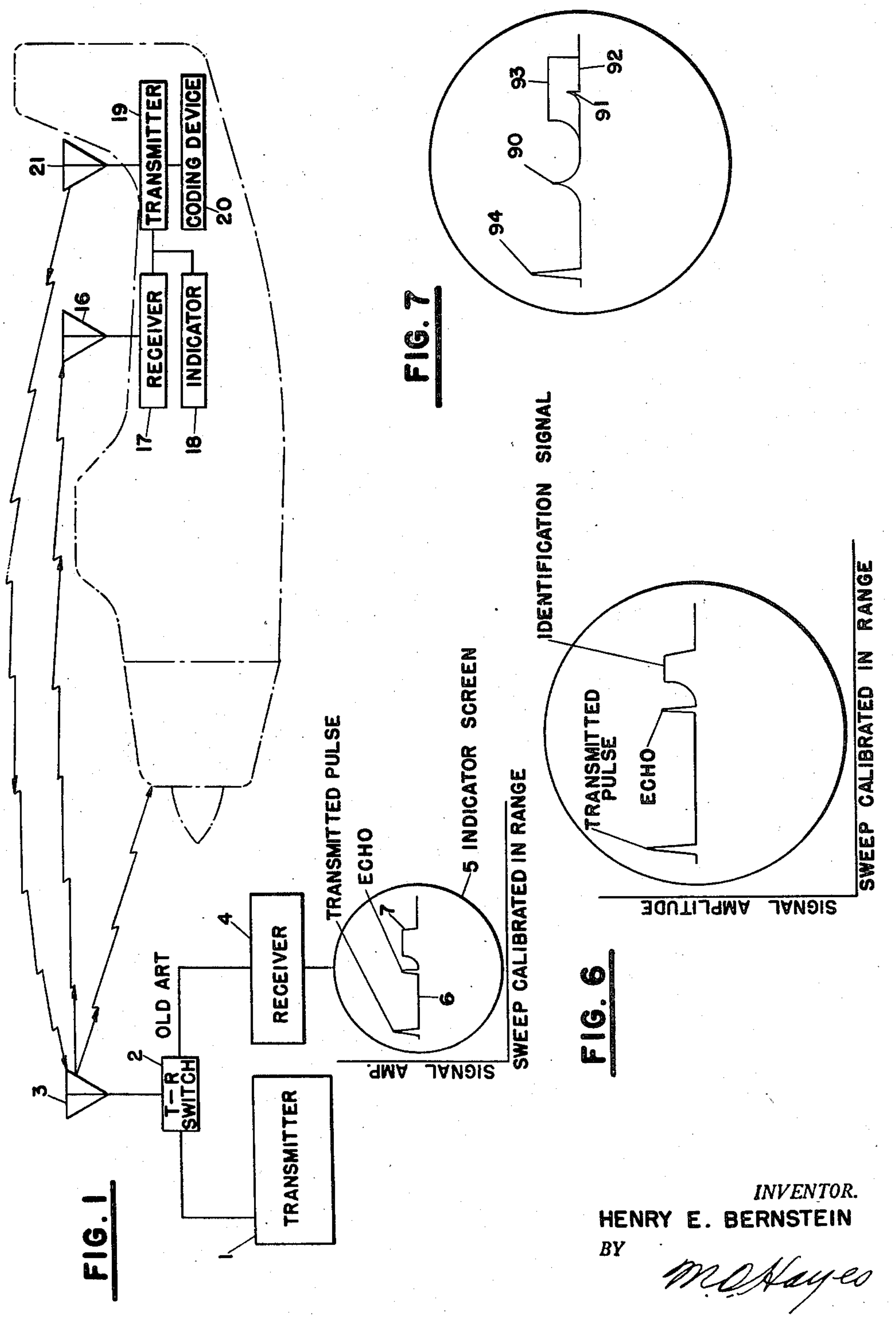
Figure 1 represents by a block diagram a system for practicing my invention wherein my identification equipment is shown in operative relation to a radar apparatus.
Figure 6 is a representation of the radar indicator pattern when used in combination with one form of my device such as shown in Figure 1.
Figure 7 is a representation of the radar indicator trace when used with a second form of my device such as shown in Figure 3.

For the better understanding of my invention, a brief description of a radar equipment with which it is to be used is herewith presented. Referring to Figure 1, the portion of figure labelled "Old Art" is a radar system in its simplest form. This system is shown to comprise an antenna 3 which is usually directional and movable for scanning purposes, a transmitter 1 of the radio frequency pulse emitting type, a receiver 4, tuned to the frequency of the transmitter 1, and an indicator 5 of the cathode ray oscilloscope type. The transmit-receive switch 2 is provided where it is desirable to use one antenna for both transmitting and receiving. The operation of the radar device consists in the generation by transmitter 1 of repeated pulses of radio frequency energy which are radiated into space by antenna 3.

Simultaneously with the generation of a pulse by the transmitter the recording or trace of the cathode ray indicator is started. The radiated signal progresses out in space unless a reflecting object is encountered. The reflecting object reverses the direction of propagation of that portion of the radiated signal which impinges upon it. This reflected energy is returned in part to antenna 3, is detected and amplified by the receiver 4 and appears on the cathode ray trace 6 as a deflection, which for the purpose of identification is marked "echo." Since the cathode ray trace is caused to sweep at a predetermined rate, the incremental space between any two deflections of the trace is a measure of time and therefore distance, if the deflections are caused by the receipt of radiant energy which has traversed the space from the equipment to an object and back to the equipment because the velocity of the propagation is a constant. As shown, the transmitted pulse as well as the received pulse are indicated by deflections of the trace, and the distance between the deflections is therefore a measure of the distance from the radar equipment to the reflecting object.

It is apparent that the function of identification by the equipment so far described is lacking.

I propose to provide a receiver 17 and a transmitter 19 on the detected object which may be a mobile craft. This receiver and transmitter are arranged to operate on the same frequency as radar transmitter 1 and receiver 4.

A practical situation wherein the mobile craft is in a position of obstruction to the path of propagation of a pulse of radio frequency energy radiated by radar is assumed for purposes of explanation.

A portion of the impinging energy is reflected by the surface of the mobile craft and another portion energizes antenna 16 from which the pulse of radiant energy is conducted to receiver 17. Receiver 17 rectifies, and modifies the incoming pulse and, in a manner that will presently be shown, utilizes the same to key-on transmitter 19. Transmitter 19 emits a signal of radio frequency energy through antenna 21. The receipt of this signal by the radar receiver 4 and its indication on the radar indicator is the final step in the cycle of identification.

The response signal may be coded or characterized as by a device 20, the operation of which will later be explained. The appearance of a coded response signal on the radar indicator 5, will have an identifying characteristic such as length as shown at 7 Figure 1. The identifying equipment may also have an indicator 18 to show that a signal is incoming from an interrogating radar installation.

The apparatus and manner used by me to achieve the objective above discussed will now be explained in detail.

Figure 2:
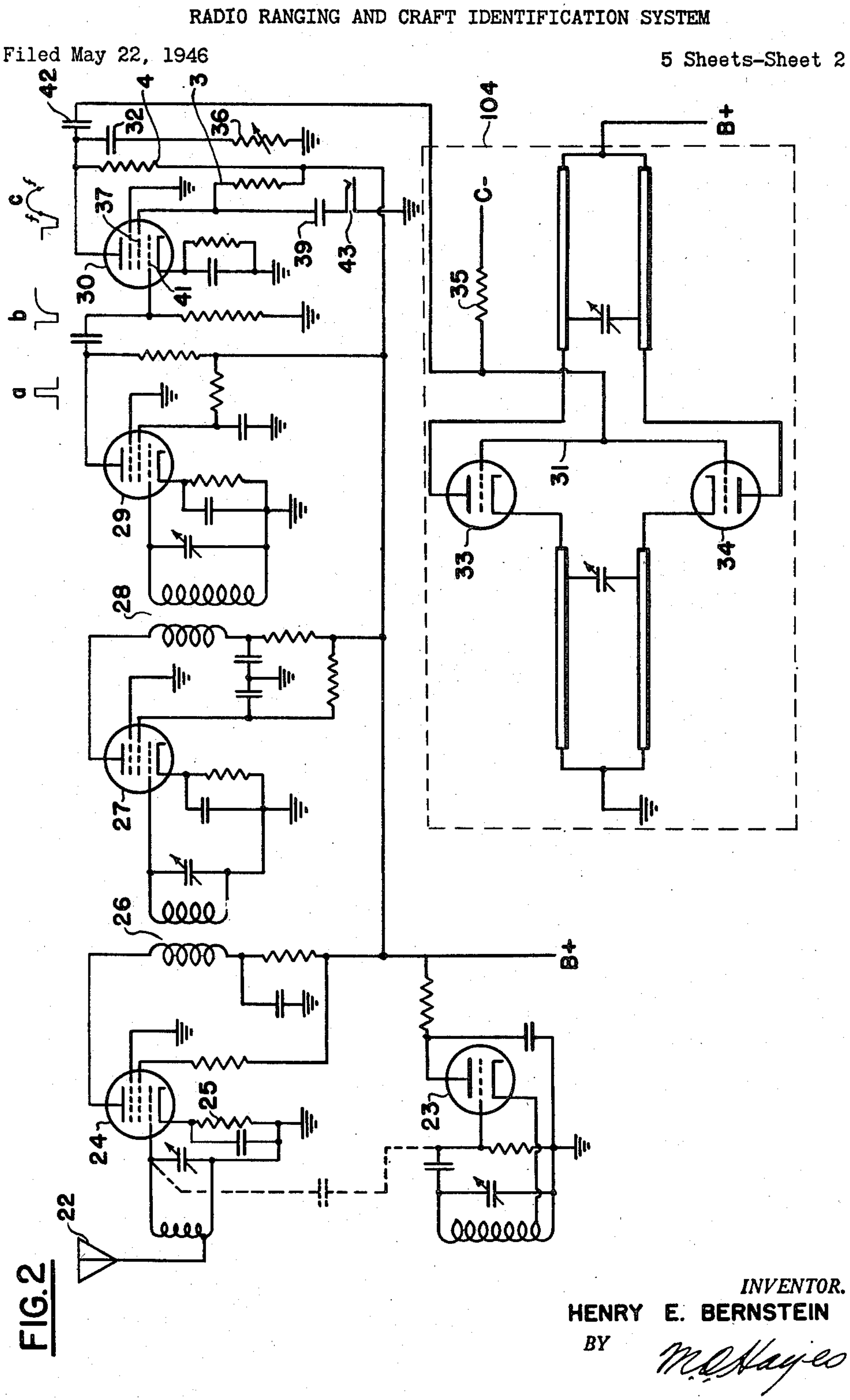
Figure 2 illustrates schematically one form of my identification apparatus.

In Figure 2, a superheterodyne receiver, tuned to the frequency of the radar transmitter with which it is to be used, includes a first detector-mixer tube 24, local oscillator tube 23, and intermediate frequency amplifier tube 27. The second detector tube 29 is a detector of the self-bias type. A radar pulse received by the receiver is rectified by tube 29 and the now positive uni-directional pulse is resistance- capacitor coupled to trigger tube 30 wherein it is further amplified and serves to trigger transmitter 104 into oscillation in a manner which will presently become apparent.

Transmitter 104 comprises a push-pull tuned-grid, tuned-plate oscillatory circuit including triode 33 and 34. The triode tubes are biased beyond cut-off. If the negative bias has superimposed on it a positive increment, the circuit will oscillate as long as the positive increment is effective in reducing the negative bias to less than cut-off value.

The manner in which the positive increment of bias is derived is as follows: Referring to trigger tube 30, it will be noticed that the anode load resistor 40 is in shunt with a resistor 36 capacitor 32 network. In addition, the anode of trigger tube 30 is coupled by capacitor 42 to the grid end of grid leak resistor 35 in the transmitter bias system. During the period when no signal is being received, capacitor 32 becomes charged to the normal no-signal anode voltage of tube 30. If now a positive pulse *a* is applied to the grid 41 of the trigger tube, the cathode-anode resistance of the tube immediately decreases and discharges capacitor 32. Upon the removal of the pulse on the grid, the cathode-anode resistance returns to its original value permitting the anode voltage and therefore the potential across capacitor 32 to increase as shown at *b* at an exponential rate depending on value of resistance 36. This increasing or positive-going potential shown at *c* is coupled to the grid of the transmitter tube by capacitor 42 and constitutes the necessary positive increment to permit the transmitter to oscillate. The period of time which is to lapse between the instant the radar pulse is received and transmitter 104 generates a reply can be controlled by adjusting the value of resistor 36. Also the period of oscillation of the transmitter can be predetermined by a choice of values of resistor 36 and 40 and capacitor 32 for the reason that these elements control the slope of voltage curve C and therefore controls the duration in which the bias is less than the cut-off value. The oscillator is operative for the period that the grid voltage is above the critical value, that is, the time *f*—*f* on curve C.

Figure 3:
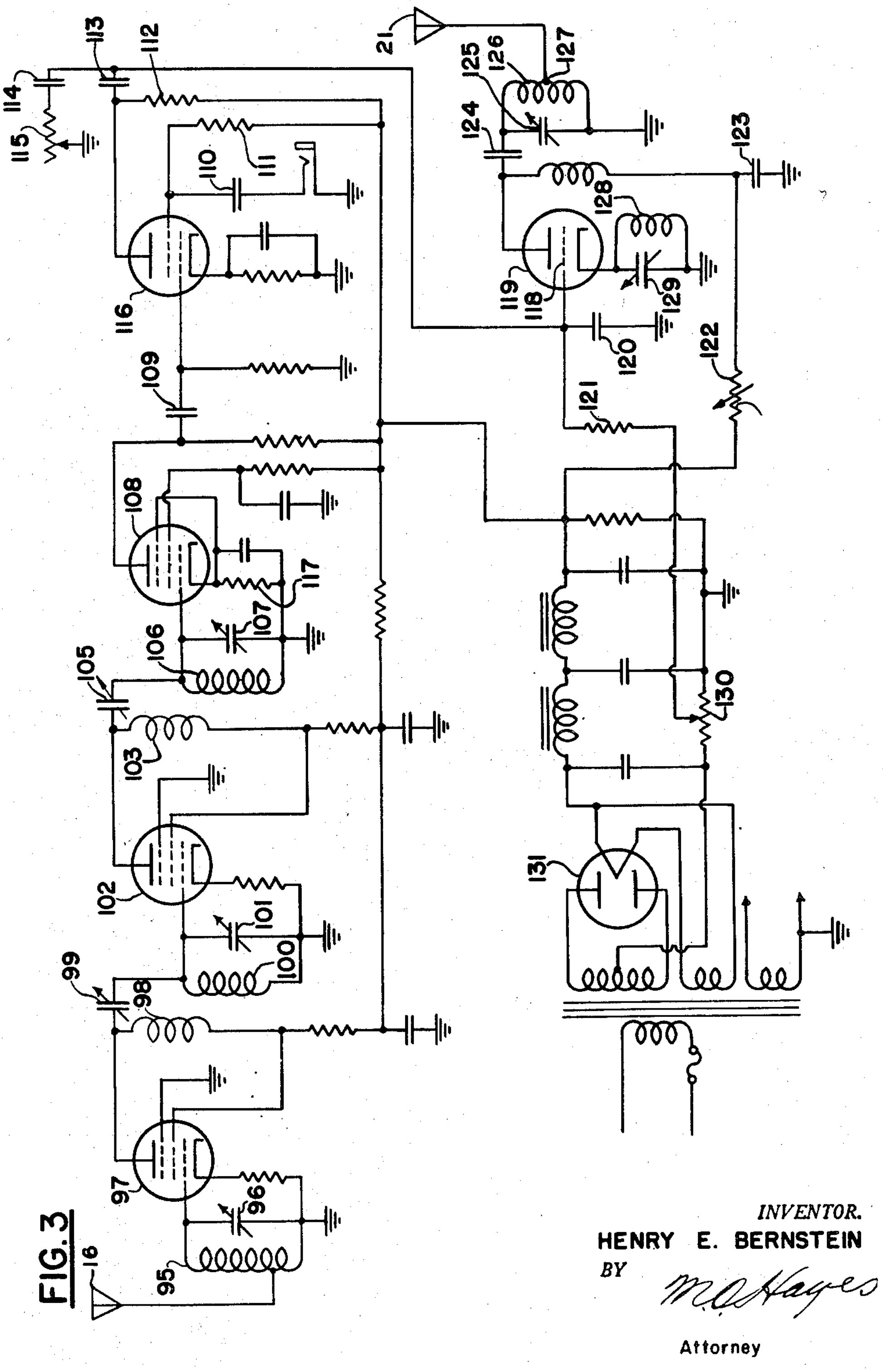
Figure 3 is a schematic diagram of an improved form of my device.

Figure 3 shows a modified receiver-transmitter, wherein radio frequency amplifying tubes 97, 102 and 108 are arranged in a cascade impedance-capacitor coupled system. Tube 108 is a biased detector similar to detector 29 explained in Figure 2. Trigger tube 116 creates a positive exponential increment of voltage which is superimposed on the cut-off negative grid voltage of oscillator tube 119. Oscillator tube 119 in conjunction with plate tank 125—126, and cathode tank 128 and 129, generates an oscillatory signal which is transferred to an antenna such as 21 of Figure 1 by impedance matching tap 127. The power supply is conventional except that it has an adjustable resistor 130 in the negative leg in order to provide an adjustable fixed negative bias for oscillator grid 118. The delay period between receipt of a radar signal and of oscillation of transmitter 119 is controlled in a manner similar to the transmitter of Figure 2 by variation of resistor 115.

The oscillator anode power supply has an adjustable resistor 122 in series between the anode and the power source, and a fixed capacitor 123 between the anode end of resistor 122 and ground. The purpose of this arrangement becomes apparent from inspection of Figures 6 and 7. Figure 6 shows the type of trace obtained on the radar oscilloscope when an arrangement such as Figure 2 is used. Each pulse of the radar transmitter produces an echo and an identification pulse from the mobile craft transmitter. It is apparent that the identification pulse blankets part of the cathode ray trace thus rendering that portion diabled for detecting and ranging. This condition can be remedied by permitting the responding transmitter to answer only alternative challenging pulses from the radar transmitter. This is the purpose of resistor 122 in Figure 3. Upon firing of oscillator tube 119, capacitor 123 becomes discharged and must charge through resistance 122 which is adjusted so that an interval greater than that between two radar pulses is necessary before capacitor 123 is again recharged to a voltage sufficient to permit the oscillatory tubes to again break into oscillation. The response to alternate radar pulses thus permits the radar equipment to search without interference on alternative pulses and a trace such as that of Figure 7 may be expected. In this trace, deflection 94 is the transmitted pulse, deflection 90 is the reflected signal or echo, deflection 93 is the identification response and a deflection obtained on alternate pulses denoting an echo from another object or vehicle is marked 91.

Figure 4:
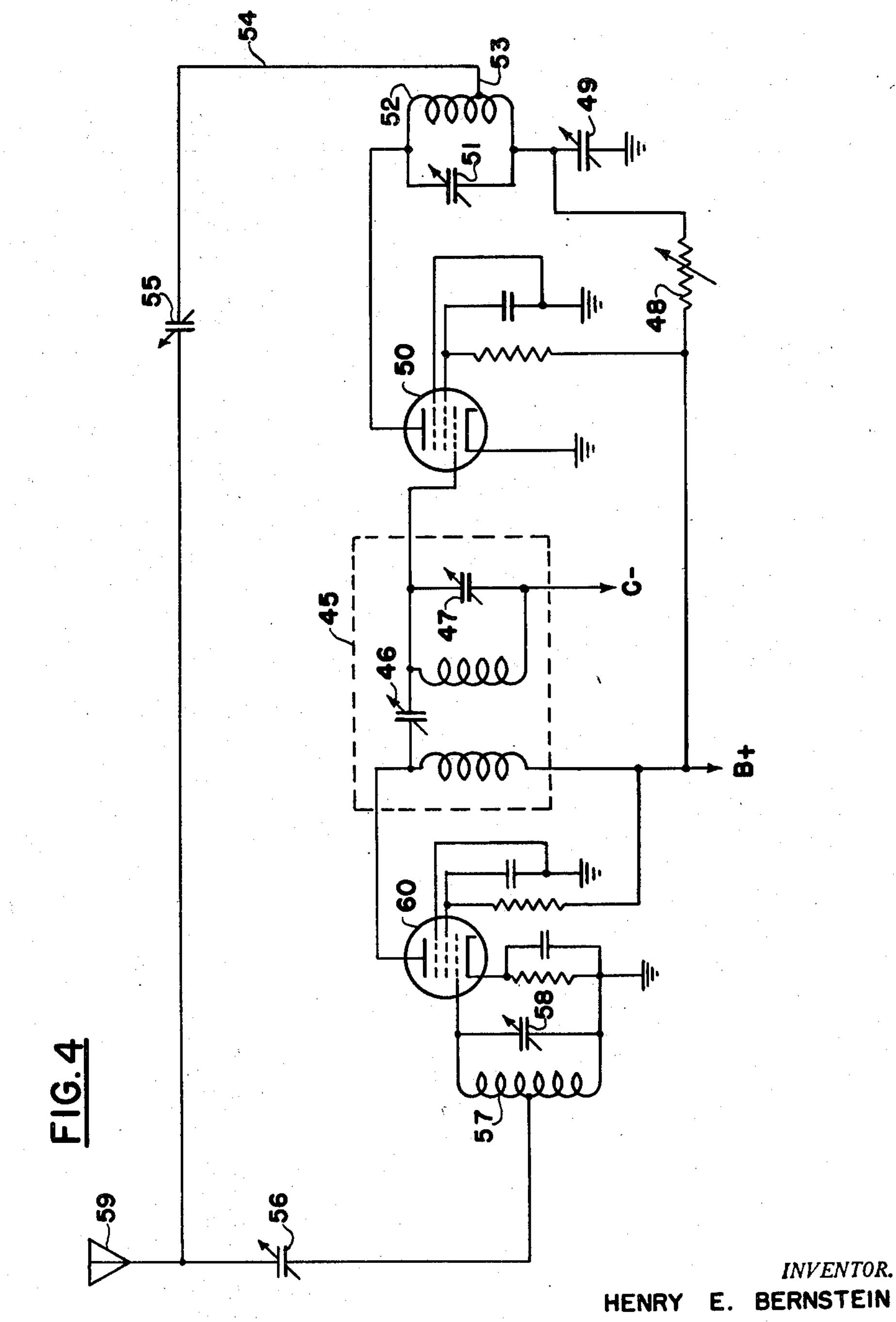
Figure 4 is a schematic representation of still another form of receiving-transmitting identification apparatus.

Another type of responding identification equipment having unusual properties is shown in Figure 4. Tube 60 is arranged in a class A cascade radio frequency amplifier circuit, and is coupled to a negatively biased amplifier tube 50 through a plate impedance-tuned grid arrangement 45. The two tubes 60 and 50 form an oscillatory circuit wherein a pulse amplified by tube 60 is effective in rendering tube 50 conducting, whereby the amplified output of tube 50 is in part, fed back through capacitor 55 to the input of tube 60. The amplitude of the signal continues to build up and the combined circuit to oscillate. This condition would continue indefinitely except for plate power exhaustion that occurs as a result of resistor 48 and capacitor 49 in the plate circuit supply. The action of resistor 48 and capacitor 49 is similar to that of resistor 122 and capacitor 123 of the transmitter of Figure 3. An unusual feature of this circuit is that upon receipt of a radar pulse of frequency approximate but not necessarily equal to that to which the circuit is tuned, the circuit breaks into oscillation at the radar frequency and continues to oscillate with very slight if any frequency drift until the oscillation damps out for lack of sufficient anode voltage as the charge in capacitor 49 becomes exhausted.

Figure 5:
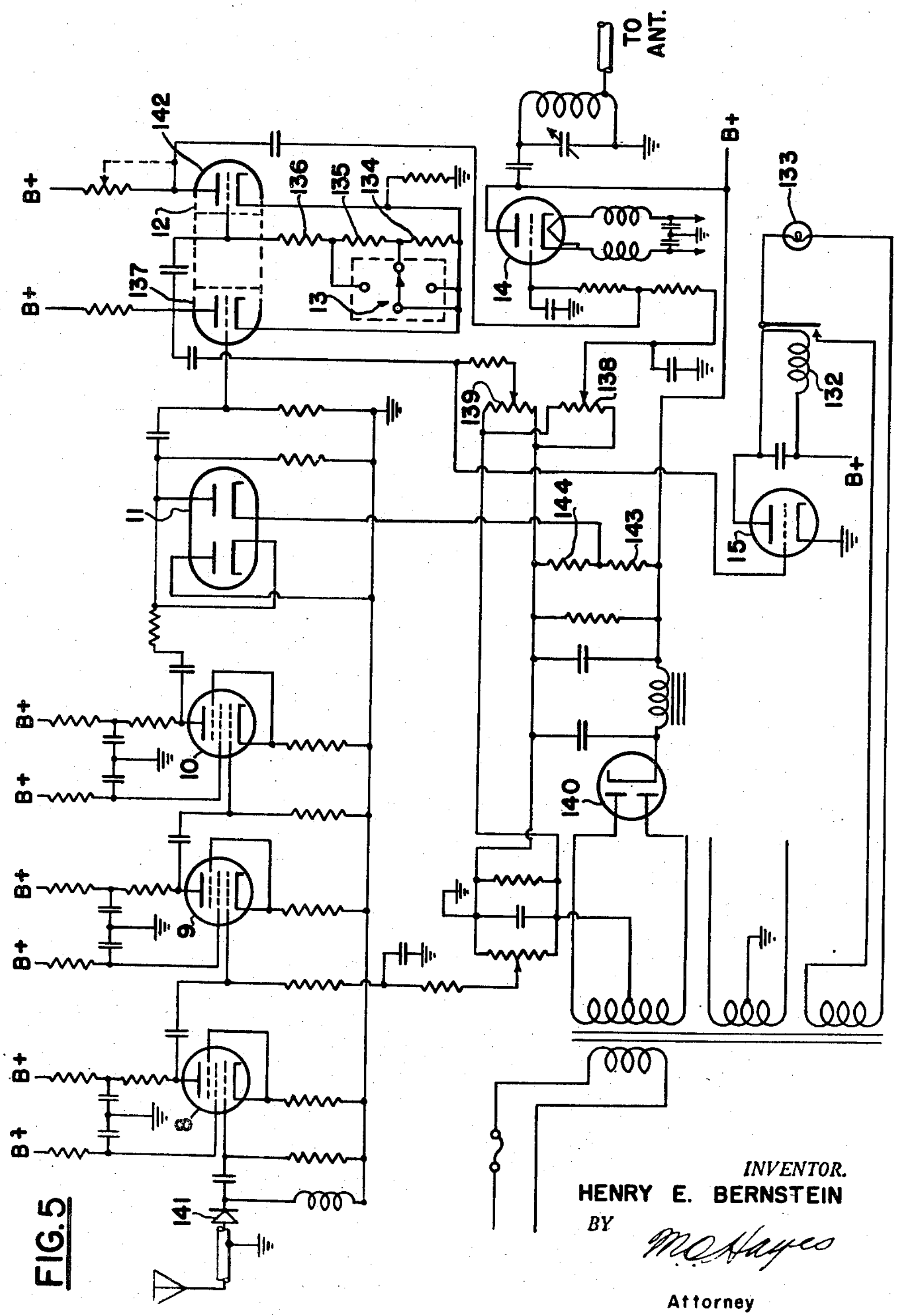
Figure 5 illustrates schematically another embodiment of identification equipment having a wide range amplifier including a visually signalling device.

Another embodiment of my invention which is particularly suitable for extremely high frequencies is shown in Figure 5. In this circuit demodulation of the received radar pulse is obtained by a crystal detector 141. The demodulated pulse is then amplified by cascade resistance-capacitance amplifier stages 8, 9, and 10. The amplified output of stage 10 is applied to the double diode limiter 11. The threshold of limiting is obtained by the values chosen for resistors 143 and 144. Amplification of the signal at constant level is obtained by first triode section 137 of tube 12 and the second triode section 142 of tube 12 provides a trigger function for the firing of oscillator tube 14 in the same manner as heretofore explained with reference to oscillator triode 119 of Figure 3. The amplitude of the triggering pulse is adjustable by the switching of grid to ground resistors 134, 135 and 136 by switch 13. In addition, a portion of the output signal of the first triode portion 137 of tube 12 is applied to a second trigger tube 15. The bias of tube 15 is adjusted by the voltage divider 139 in a negative leg of rectifier tube 140, so that the receipt of a radar pulse will result in the plate current of tube 15 increasing sufficiently to close relay 132. The closing of relay 132 results in energizing warning indicator lamp 133.

One of the advantages of the system of a stationary radar installation and the mobile receiver-transmitter responding installation particularly in the case of ships or aircraft is that all the equipments are operated on a single frequency. This is especially desirable because it enables a single radar equipment to indicate the position and identity of a plurality of mobile craft. Furthermore, regardless of visibility conditions, each mobile craft may be appraised not only of its own position but of the position of other mobile craft in the vicinity. Of course, it is understood that the usual communication equipment is a desirable supplement in this system.

The invention described herein may be manufactured and used by or for the Government of the United States of America for governmental purposes without the payment of any royalties thereon or therefor.

I claim:

1. An automatic radio responding device comprising in combination a receiver arranged to detect radio frequency signals of a selected frequency and having an amplifier to increase the amplitude of the detected signal, a transmitter comprising an oscillatory circuit, said circuit comprising an oscillatory tube capable of emitting signals of the same selected frequency, a power supply source for said oscillatory tube, a source of negative grid bias, said grid bias having a negative value sufficient to render the oscillatory tube quiescent, means for superimposing the signals detected by said receiver as a positive voltage on the negative bias of said oscillator tube to permit the same to oscillate, said superimposed positive voltage having an exponential time rate of growth, and means to render said oscillatory tube unresponsive to succeeding detected signals for a predetermined period after emission of a signal, said last mentioned means being a resistance-capacitance circuit connected between the anode of the oscillatory tube and the power supply source.

2. A radio responding device including in combination a radio transmitter, a radio receiver responsive to a pulsed carrier, a power source for said receiver, demodulation means for obtaining from said carrier a pulse of unidirectional current, means for deriving from said pulse an exponential time rate of change of voltage, means to apply said exponential time rate of change of voltage to key-on said transmitter for a period determined by the period of growth of said exponential time rate of change of voltage, and means to render said transmitter unresponsive to succeeding detected signals for a predetermined period after emission of a signal, said last mentioned means comprising a resistance-capacitance network connected in shunt across the output of the receiver, said capacitance being charged through the resistance by the power source.

3. A radio responding device including in combination a radio transmitter, said transmitter having at least one oscillatory tube with an anode, grid, and cathode, a power supply source for said transmitter oscillatory tube, a radio receiver responsive to pulses of radio frequency energy, demodulation means for obtaining pulses of unidirectional voltage from said radio frequency energy, adjustable means for deriving triggering voltages having an adjustable time rate of growth from said pulses of unidirectional voltages, means for applying said triggering voltages to key-on said transmitter, and means to render said transmitter oscillatory tube unresponsive to succeeding unidirectional pulses for a predetermined period after emission of a signal by the transmitter, said last mentioned means being a resistance-capacitance circuit connected between the anode of the transmitter oscillatory tube and the power supply source.

4. A radio responding device including in combination a radio frequency pulse emitting transmitter, said transmitter having at least one oscillatory tube with an anode, grid and cathode, bias means to render said transmitter quiescent, a radio receiver responsive to a pulse of radio frequency energy, demodulation means for obtaining a pulse of unidirectional voltage from said radio frequency energy, means to derive a triggering voltage having an exponential time rate of growth from said unidirectional pulses and means for applying said triggering voltage to key-on said transmitter at a predetermined time after the receipt by the receiver of said pulse of radio frequency energy, a power supply source, means to render said oscillatory tube unresponsive to succeeding detected signals for a predetermined period after emission of a signal, said last mentioned means comprising a resistor-capacitor network connected between the anode of the oscillatory tube and the power supply source, said capacitor being charged through the resistor by said power supply source to act as the anode supply source for said oscillatory tube, said transmitter remaining keyed-on for a period determined by the charge on the condenser and remaining unresponsive after the transmission for a period determined by the value of the resistor.

5. An automatic radio identification device including the combination of a first transmitter capable of emitting pulses of radio energy having a selected frequency, a first receiver capable of detecting pulses of radio energy having said such selected frequency and an indicator capable of indicating the time lapse between the emission of such pulses of radiant energy and the receipt of the same; a second receiver capable of detecting radiant energy emitted by said first transmitter, a second transmitter having an electrical connection to said second receiver whereby detection of energy emitted by said first transmitter to the said second receiver causes the second transmitter to emit radio energy having the aforesaid frequency, said second receiver having a time delay means forming a part of the final stage thereof for determining a delay between the detection of energy by the second receiver and emission by the second transmitter, said second transmitter having at least one oscillatory tube with an anode, grid and cathode, a power supply source, means to render said oscillatory tube unresponsive to succeeding detected signals for a predetermined period after emission of a signal, said last mentioned means comprising a resistance-capacitance network connected between the anode of the oscillatory tube and the power supply source, said capacitance being charged through the resistance by said power supply source to act as the anode supply source for said oscillatory tube, said second transmitter remaining keyed-on for a period determined by the charge on the capacitance and remaining unresponsive after the transmission for a period determined by the value of the resistance.

6. An automatic radio responding device comprising in combination, a receiver arranged to detect radio signals of a preselected frequency, and having an amplifier having a multi-element amplifier tube including a cathode, control grid and anode, a source of anode voltage, an anode load resistor connected between said anode and the positive end of said source of anode voltage, and a first capacitor in series with a resistor connected between said anode and the negative end of said anode voltage source whereby under quiescent conditions, said capacitor becomes charged to the anode voltage, and becomes discharged upon the application of a signal to the grid of the amplifier tube; a second capacitor having a first and a second terminal, the first terminal being connected to the said anode; and a transmitter arranged to emit radio signals having the aforementioned preselected frequency and including a multi-element transmitter tube having a grid, and a source of bias sufficiently negative to render said tube non-oscillating, said second terminal of said second capacitor being connected to the grid of said transmitter tube, whereby after discharge of said first capacitor upon receipt of a signal by said receiver, the positive growth of voltage in said first capacitor is coupled by said second capacitor to the grid of the transmitter tube, whereby said transmitter tube emits a signal during the charging of said first capacitor.

7. A radio responding device including in combination a radio frequency pulse emitting transmitter, having one or more oscillatory tubes each having a cathode, a grid and an anode, negative grid bias means to render the transmitter normally quiescent, a power supply source and a transmitter anode voltage supply source comprising a capacitor charged through a resistor by said power supply source, a radio receiver responsive to a pulse of radio frequency energy, having demodulation means for obtaining from said radio frequency energy a pulse of unidirectional voltage, and, adjustable means for deriving from said unidirectional voltage a positive triggering voltage having an exponential time rate of growth and means to apply said positive triggering voltage to reduce the effect of said bias means and thereby key-on said transmitter at a predetermined time after receipt of said pulse of radio frequency energy by said receiver and for a period of transmission dependent on the value of the capacitor and resistor in said anode voltage supply source.

8. A radio responding device comprising a combination with a transmitter capable of emitting pulses of radiant energy having a selected frequency, and a first receiver, a receiver-transmitter comprising an antenna, a first amplifier tube, a first network adapted to transfer energy of said selected frequency from said antenna to said first amplifier tube, a second amplifier tube having at least a cathode, an anode and a grid, said grid having impressed on it a negative bias equal to the cut off value under no signal conditions, a second network broadly tuned to said selected frequency and arranged to couple the first amplifier tube to the grid of said second amplifier tube, an inductance-capacitance tank circuit coupling the anode of said second tube to said antenna and to said first network, and an anode voltage source for said second tube comprising a capacitor charged through a resistor, whereby the interception by said antenna of a signal emitted by said transmitter causes said receiver-transmitter to generate a signal capable of being received by said first receiver and for a duration determined by the charge in said capacitor and the value of said resistance.

9. The device of claim 5 in which said time delay means is adjustable.

10. The device of claim 7 in which said resistor is adjustable.

HENRY E. BERNSTEIN.

REFERENCES CITED

The following references are of record in the file of this patent:

UNITED STATES PATENTS

| Number | Name | Date |
|---|---|---|
| 2,252,083 | Luck | Aug. 12, 1941 |
| 2,405,237 | Ruhlig | Aug. 6, 1946 |
| 2,414,992 | Wheeler | Jan. 28, 1947 |
| 2,415,359 | Loughlin | Feb. 4, 1947 |
| 2,421,016 | Deloraine | May 27, 1947 |
| 2,444,426 | Busignies | July 6, 1948 |
| 2,444,452 | Labin | July 6, 1948 |
| 2,453,970 | Charrier | Nov. 16, 1948 |

FOREIGN PATENTS

| Number | Country | Date |
|---|---|---|
| 116,666 | Australia | Oct. 10, 1941 |